US008543530B2

(12) United States Patent
Suh

(10) Patent No.: US 8,543,530 B2
(45) Date of Patent: Sep. 24, 2013

(54) CARD AUTHORIZATION TERMINAL SYSTEM AND CARD MANAGEMENT METHOD USING THE SAME

(75) Inventor: Jung-Hyung Suh, Seoul (KR)

(73) Assignee: Korea Smart Card Co., Ltd. (KR)

( * ) Notice: Subject to any disclaimer, the term of this patent is extended or adjusted under 35 U.S.C. 154(b) by 1103 days.

(21) Appl. No.: 12/231,278

(22) Filed: Aug. 28, 2008

(65) Prior Publication Data

US 2009/0125558 A1 May 14, 2009
US 2012/0150794 A9 Jun. 14, 2012

(30) Foreign Application Priority Data

Aug. 21, 2007 (KR) .................. 10-2007-0083966

(51) Int. Cl.
*G06F 9/44* (2006.01)
*G06N 7/02* (2006.01)
*G06N 7/06* (2006.01)

(52) U.S. Cl.
USPC .......................................... 706/52

(58) Field of Classification Search
USPC .......................................... 706/52
See application file for complete search history.

(56) References Cited

U.S. PATENT DOCUMENTS

| 4,935,608 | A | * | 6/1990 | Tanaka | 235/380 |
| 5,144,649 | A | * | 9/1992 | Zicker et al. | 455/409 |
| 5,220,593 | A | * | 6/1993 | Zicker et al. | 455/407 |
| 5,828,044 | A | | 10/1998 | Jun et al. | |
| 5,936,221 | A | | 8/1999 | Corder et al. | |
| 5,945,653 | A | * | 8/1999 | Walker et al. | 235/380 |
| 6,208,978 | B1 | * | 3/2001 | Walker et al. | 705/38 |
| 7,844,481 | B2 | * | 11/2010 | Hilbush et al. | 705/7.13 |
| 8,370,187 | B2 | * | 2/2013 | Hilbush et al. | 705/7.13 |
| 2004/0111365 | A1 | | 6/2004 | Hong | |
| 2005/0216405 | A1 | | 9/2005 | So | |

FOREIGN PATENT DOCUMENTS

| EP | 1150197 A2 | 10/2001 |
| JP | 04-222088 | 8/1992 |
| JP | 2004-326424 | 11/2004 |
| KR | 10-0287012 | 1/2001 |

(Continued)

OTHER PUBLICATIONS

"International Application Serial No. PCT/KR2008/001028, International Search Report mailed Jun. 9, 2008", 3 pgs.

(Continued)

*Primary Examiner* — Michael B Holmes
(74) *Attorney, Agent, or Firm* — Schwegman, Lundberg & Woessner, P.A.

(57) ABSTRACT

A card authorization terminal system of present invention includes a card identifying unit, a database management unit, and an authorization processing unit. The card identifying unit deciphers card property information stored in a card and determines whether the card is valid. The database management unit determines final card property information based on the card property information deciphered by the card identifying unit and property change information stored in the database management unit. The authorization processing unit calculates charges and processes card transactions based on the final card property information generated by the database management unit. The database management unit generates identification numbers sequentially assigned from a predetermined number with respect to respective card numbers corresponding to the property change information, stores the identification number and the property change information corresponding to the identification numbers, and determines the final card property information corresponding to the card property information based on the stored property change information.

24 Claims, 7 Drawing Sheets

(56) References Cited

FOREIGN PATENT DOCUMENTS

| KR | 10-0378445 | | 3/2003 |
|---|---|---|---|
| KR | 10-0387355 | B1 | 5/2003 |
| KR | 20-0315677 | | 5/2003 |
| KR | 10-2004-0087592 | | 10/2004 |

OTHER PUBLICATIONS

"International Application Serial No. PCT/KR2008/001028, Written Opinion mailed Jun. 9, 2008", 4 pgs.

* cited by examiner

CARD AUTHORIZATION TERMINAL SYSTEM AND CARD MANAGEMENT METHOD USING THE SAME

RELATED APPLICATION

This application is a continuation under 35 U.S.C. 111(a) and claims the benefit under 35 U.S.C. §120 and §365(c) of priority to International Application PCT/KR2008/001028, filed Feb. 21, 2008, which application claims priority to Korean Application No. 10-2007-0083966, filed Aug. 21, 2007, which applications are incorporated herein by reference and made a part hereof.

TECHNICAL FIELD

The present invention relates to an authorization terminal system and a card management method using the authorization terminal system, and more particularly, to an authorization terminal system using a database management system and a card management method using the authorization terminal system.

BACKGROUND ART

Recently, electronic cards, including a prepaid card or a post-payment card, have been widely used to pay the cost of using various forms of transportation, including a bus or subway. In a post-payment card method, a transportation card function is added to a credit card and transportation fares incurred by a user are charged monthly with the credit card bill. In a prepaid card method, money is previously charged onto the prepaid card. In addition to a transportation payment method, the prepaid card has been widely used for various other payment methods.

A card authorization terminal system authenticates the transportation cards and charges corresponding fares. Recently, fares have been differentiated according to property information (e.g., adult and youth) and charged.

To differently charge fares according to the property information, the card authorization terminal system is required to continuously manage changes of properties corresponding to a card number or an identification number (e.g., a change from a youth to an adult, or a discount rate change).

DISCLOSURE OF INVENTION

Technical Problem

As a conventional method of the card authorization terminal system, there is a flag method (a bitmap method) in which change flags (bits) for entire cards are managed and used when the card authentication is performed. However, change information is stored as a file type in a memory of an authentication system and is read to use it when it is required in the flag method.

That is, in the conventional method, since flags for all the cards are stored and memory addresses corresponding to card numbers are sequentially searched based on the stored flags, searching time is considerably increased.

Technical Solution

The present invention has been made in an effort to provide a card authorization terminal system for preventing malfunctions of a system, and a card management method using the card authorization terminal system.

According to an exemplary embodiment of the present invention, a card authorization terminal system includes a card identifying unit, a database management unit, and an authorization processing unit. The card identifying unit deciphers card property information stored in a card and determining whether the card is valid. The database management unit determines final card property information based on the card property information deciphered by the card identifying unit and property change information stored in the database management unit. The authorization processing unit calculates charges and processes card transactions based on the final card property information generated by the database management unit. The database management unit generates identification numbers sequentially assigned from a predetermined number with respect to respective card numbers corresponding to the property change information, stores the identification number and the property change information corresponding to the identification numbers, and determines the final card property information corresponding to the card property information based on the stored property change information.

According to another exemplary embodiment of the present invention, in a card management method of a card authorization terminal system including a database management unit storing property change information, card property information written in a card is deciphered, it is determined whether there are identification numbers corresponding to card numbers, property change information that corresponds to the identification numbers and is stored in the database management unit is determined to be final card property information when there are identification numbers, and charges are calculated by using the final card property information and processing a card transaction list. The identification numbers are sequentially assigned from a predetermined number with respect to the card numbers corresponding to the property change information by the database management unit.

According to the exemplary embodiment of the present invention, since a physical memory area is efficiently managed, a problem of memory capacity limitation is solved, and a processing speed delay caused by a file processing structure or multiple processes is improved.

Since the amount limitation of change management information is solved and various types of card information may be managed, various services using a card may be provided.

Advantageous Effects

According to the exemplary embodiment of the present invention, tables are generated in a database management system according to identification numbers for identifying the card provider, and serial numbers, identification numbers corresponding to the serial numbers, and property information are stored with respect to the card numbers including the changed properties. In addition, since it is simultaneously determined through one piece of card property change information whether it is a card provider card and property information is changed, and a searching time for stored property change information is reduced, a card authorization process may be quickly performed.

Further, according to the exemplary embodiment of the present invention, since new property information may be managed by adding one column to the table when the new property information is added to be managed, various pieces of property information may be added and managed in a relatively small memory space.

BEST MODE FOR CARRYING OUT THE INVENTION

Figure 1:
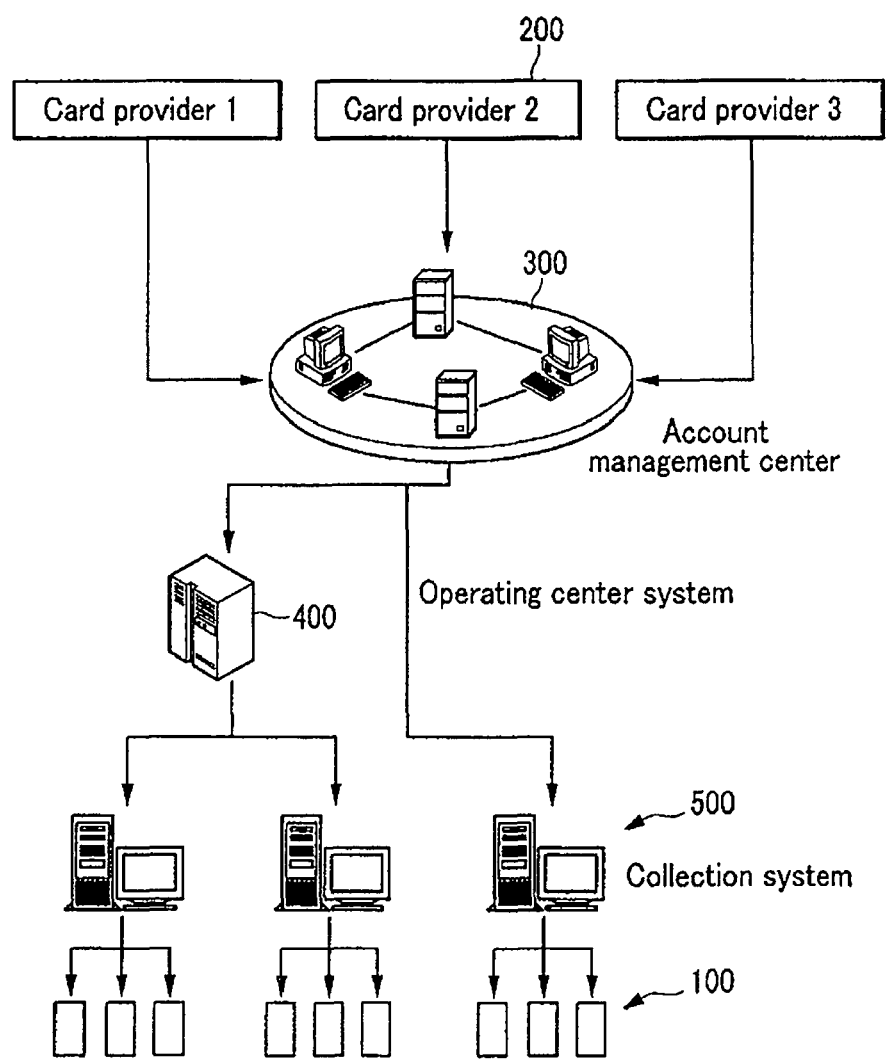
FIG. 1 is a diagram of a transportation card management system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements. Further, each of terms, such as "unit", "device", and "module" described in the specification mean a unit for performing at least one function or operation, and may be embodied by hardware, software, or a combination of hardware and software.

A card authorization terminal system according to an exemplary embodiment of the present invention and a card management method using the card authorization terminal system will now be described with reference to the figures.

FIG. 1 is a diagram of a transportation card management system according to the exemplary embodiment of the present invention.

A card provider system 200 issues a card including card property information (e.g., card serial numbers, a valid date, a card type, a provider identification number, usage information, and discount information), and stores the card property information in a database (not shown) of the card provider system 200. When the card property information is changed according to a user's request or a policy of a card provider, the changed information is stored in a database, and card property change information is cyclically transmitted to an account management center system 300.

The account management center system 300 combines the property change information received from the card provider system 200 for every predetermined cycle or when a lower system transmits a request, and transmits the combined property change information to the card authorization terminal system 100 through an operating center system 400 or a collection system 500.

Figure 2:
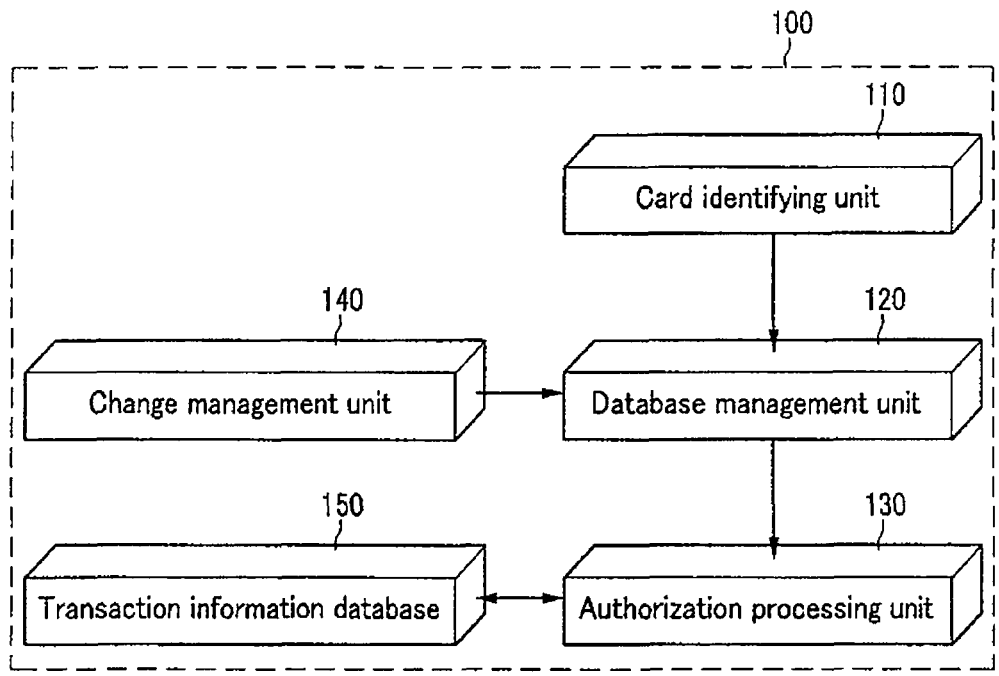
FIG. 2 is a block diagram of an internal configuration of a card authorization terminal system according to the exemplary embodiment of the present invention.

FIG. 2 is a block diagram of an internal configuration of the card authorization terminal system 100 according to the exemplary embodiment of the present invention.

As shown in FIG. 2, the card authorization terminal system 100 according to the exemplary embodiment of the present invention includes a card identifying unit 110, a database management unit 120, an authorization processing unit 130, a change management unit 140, and a transaction information database 150.

The card identifying unit 110 reads the card property information (e.g., the card serial numbers, the valid date, the card type, the provider identification number, the usage information, and the discount information) that is included when a card is issued, and determines whether the card is valid.

The change management unit 140 cyclically receives the property change information including change information of card properties from the operating center system 400 or the collection system 500, and transmits the received information to the database management unit 120. Here, the property change information includes user information (allowance or non-allowance) and discount information (adult or youth).

The database management unit 120 manages the card property information received from the card identifying unit 110 and the property change information that is received from the change management unit 140 and cyclically updated, and determines or generates final card property information required to perform an authorization process based on the card property information and the property change information.

The authorization processing unit 130 uses the final card property information output from the database management unit 120 to calculate charges and perform the authorization process, and stores an authorization process result in the transaction information database 150.

In this case, the database management unit 120 according to the exemplary embodiment of the present invention uses an exclusive database management system (DBMS) using a process that is different from that of the card identifying unit 110 and the authorization processing unit 130, to efficiently manage information input and output to/from the card authorization terminal system 100.

The DBMS is exclusive software such as Oracle or MS SQL that may easily and quickly add/modify/delete various data. In the exemplary embodiment of the present invention, a small DBMS that may be provided in a terminal authorization system is used as a program used by a plurality of computer users to write data in a database or have access to the data.

The DBMS combines data separated in each application software, the combined data are then shared by each application software, and therefore information may be systematically used. In this case, the DBMS may perform ① definition of data structure, ② accumulation of data according to the data structure, ③ search and update of data by database languages, ④ execution control of concurrent data processes of a plurality of users, ⑤ return to a previous state when an abnormal updating phenomenon occurs, and ⑥ security of information.

Since the database management unit 120 according to the exemplary embodiment of the present invention is realized as the DBMS that is an exclusive process, large capacity data may be quickly traced in a small space. In addition, since an additional process is different from an authorization process, a malfunction of the corresponding unit does not affect other functions, and therefore a problem of an overall error of a terminal system that is caused by a malfunction may be structurally prevented.

Figure 3:
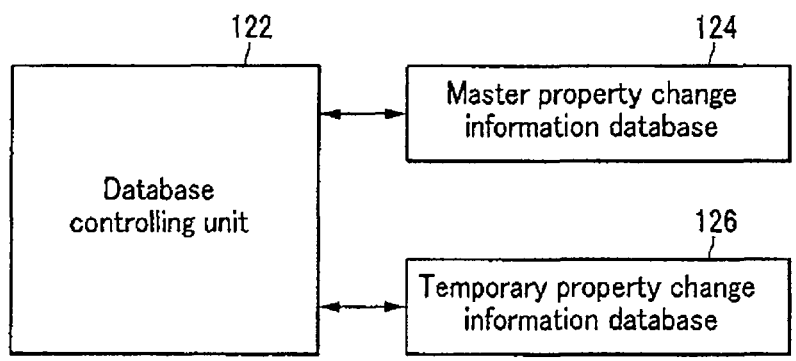
FIG. 3 is a diagram of a database management unit according to the exemplary embodiment of the present invention.

FIG. 3 is a diagram of the database management unit 120 according to the exemplary embodiment of the present invention.

As shown in FIG. 3, the database management unit 120 according to the exemplary embodiment of the present invention includes a database controlling unit 122, a master property change information database 124, and a temporary property change information database 126.

The master property change information database 124 stores changed card property information. In this case, the master property change information database 124 includes a plurality of tables matched to card provider identification numbers, and each table stores a plurality of identification number groups including serial numbers and property information of a corresponding card provider. Here, the identification number corresponds to the card serial numbers corresponding to the property information stored in the table, which will be described later in detail.

The temporary property change information database 126 temporarily stores property change information received from the change management unit 140.

The database controlling unit 122 stores the new property change information received from the change management unit 140 in the temporary property change information database 126, and cyclically updates the master property change information database 124 based on the new property change information stored in the temporary property change information database 126. In this case, when the master property change information database 124 is updated based on the new property change information, the database controlling unit 122 deletes the property change information stored in the temporary property change information database 126.

A card management method using the card authorization terminal system 100 according to the exemplary embodiment of the present invention will now be described with reference to FIG. 4.

Figure 4:
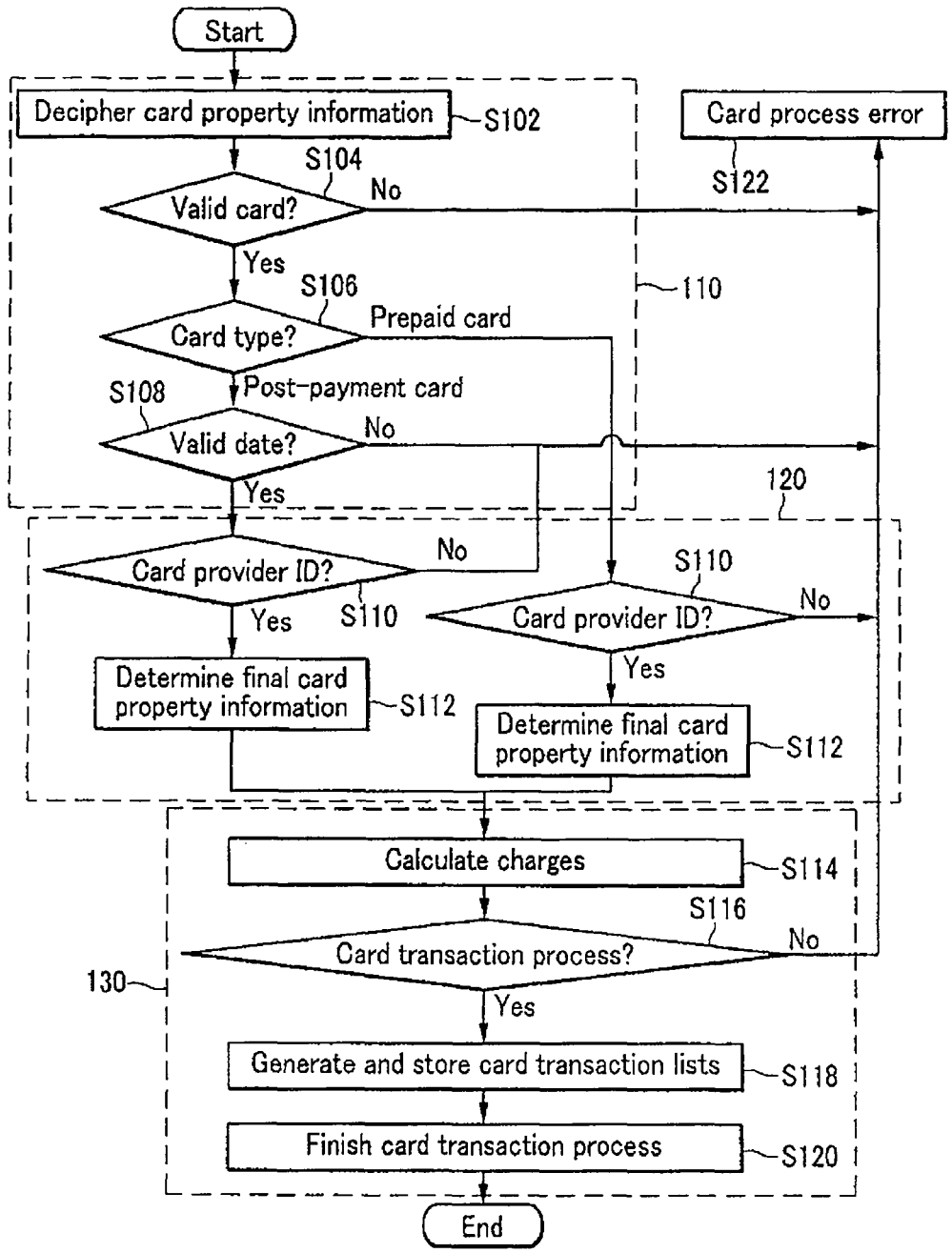
FIG. 4 is a flowchart representing a card management method according to the exemplary embodiment of the present invention.

FIG. 4 is a flowchart representing the card management method according to the exemplary embodiment of the present invention.

The card identifying unit 110 of the card authorization terminal system 100 deciphers the card property information (e.g., card serial numbers, a valid date, a card type, a card provider identification number, usage information, and discount information) stored in a memory of a card that contacts or does not contact the card identifying unit 110 in step S102.

Subsequently, the card identifying unit 110 determines in step S104 whether the corresponding card is valid, based on the card property information in step S102.

When it is determined in step S104 that the card is valid, the card identifying unit 110 identifies a card type to determine whether the card is a prepaid card or a post-payment card in step S106, and identifies a valid date from the card property information deciphered in step S102 to determine in step S108 whether the valid date is expired.

When it is determined in step S102 or S108 that the card is not valid or that the valid date is expired, the card identifying unit 110 performs an error process for the corresponding card in step S222.

When it is determined in step S106 or S108 that the card is the pre-paid card or the valid date is not expired, the database controlling unit 122 of the database management unit 120 determines in step S110 whether the master property change information database 124 includes a table corresponding to the card provider identification number included in the card property information.

When it is determined in step S110 that there is a table corresponding to the card provider identification number, the database controlling unit 122 determines final card property information required to perform an authorization process based on the card property information obtained from the card and the property change information stored in the master property change information database 124 in step S112. When it is determined in step S110 that there is no provider identification number, the database controlling unit 122 performs an error process for the corresponding card in step S122.

The steps S110 and S112 will be described in further detail later with reference to FIG. 6.

The authorization processing unit 130 calculates charges based on user information or discount information stored in the final card property information received from the database management unit 120 in step S114, and identifies the charges calculated in step S114 and balance information stored in the card to determine in step S116 whether a card transaction process is performed.

When it is determined in step S116 that the card transaction process may be performed, the authorization processing unit 130 generates card transaction lists, stores them, and finishes a card authorization process in steps S118 and S120. When an error in the card transaction process occurs in step S116, the authorization processing unit 130 performs the error process for the corresponding card in step S122.

A method for managing the card property information in the database management unit 120 according to the exemplary embodiment of the present invention will be described with reference to FIG. 5.

Figure 5:
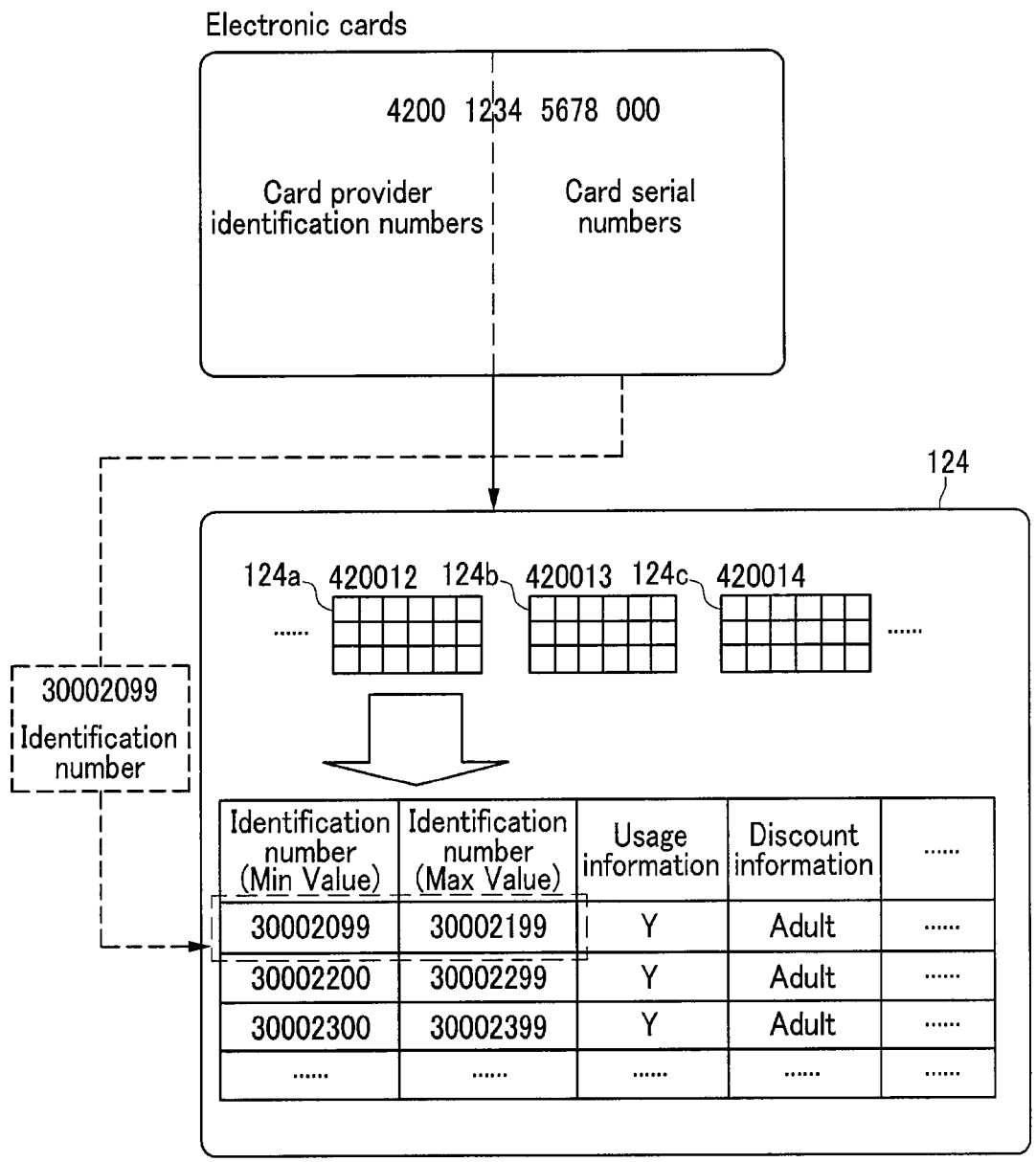
FIG. 5 is a diagram representing a method for receiving property change information according to the exemplary embodiment of the present invention.

FIG. 5 is a diagram representing a method for receiving property change information according to the exemplary embodiment of the present invention.

The database management unit 120 according to the exemplary embodiment of the present invention performs generation, update, and search of the card property change information transmitted from the change management unit 140 and that is frequently changed. In addition, the database management unit 120 determines or generates the final card property information based on the card property information output from the card identifying unit 110 and internally stored property change information.

In this case, according to the exemplary embodiment of the present invention, since the database management unit 120 is realized as a database management system using an additional process to perform the management process, a malfunction of the corresponding unit does not affect card identification, authorization process, and authentication functions, and therefore the number of errors is reduced.

As shown in FIG. 5, the database controlling unit 122 of the database management unit 120 according to the exemplary embodiment of the present invention generates a plurality of tables 124*a*, 124*b*, and 124*c* matched to provider identification numbers for identifying providers of card numbers stored in the master property change information database 124, and stores property information and card serial numbers corresponding to the provider identification numbers in the respective tables. In this case, when names of the respective tables are set to be equal to the provider identification numbers, searching speed may be improved and provider identification and card property information searches may be simultaneously performed by one searching process.

In addition, when the property change information is received from the change management unit 140, the database controlling unit 122 records changed property information in the table matched to the provider based on the card serial numbers and the property change information, and generates an identification number (Alias) corresponding to the card serial numbers. The identification number is serial numbers generated to correspond to the respective card serial numbers according to an order for storing the changed property information in the table.

The database controlling unit 122 groups the generated identification numbers for each range and stores them. That is, the database controlling unit 122 generates identification number groups by grouping values from a minimum value (Min Value) to a maximum value (Max Value) to be included in a row of the table. In this case, as shown in FIG. 5, a minimum value of each identification number group is subsequent to a maximum value of a neighboring identification group, or a maximum value of each identification number group is subsequent to a minimum value of a neighboring identification group.

The database controlling unit 122 generates the identification numbers to reduce a searching time. For example, when it is assumed that the card numbers are 4200 1243 5678 000 and the user information of the card is changed to "adult", the first six numbers (420012) of the card are identification numbers of the card provider, and the remaining numbers (435678000) are serial numbers of the card. Therefore, the database controlling unit 122 searches the table 124a corresponding to the card provider identification numbers 420012. In this case, after detecting the identification number group including the identification numbers 30002000 corresponding to the card serial numbers 435678000 among records of the table 124a, the database controlling unit 122 sequentially searches the identification numbers from a minimum value of the detected identification number group to detect the identification numbers 30002000, and records property change information (i.e., "adult") in a record corresponding to the identification numbers 30002000.

In the above property information management method according to the exemplary embodiment of the present invention, since various pieces of property change information are stored and managed in a table, the information may be efficiently managed with a small memory area. In addition, since the identification numbers are used, the searching time may be reduced.

A method (S112) for generating the final card property information shown in FIG. 4 will be described with reference to FIG. 6 and FIG. 7.

Figure 6:
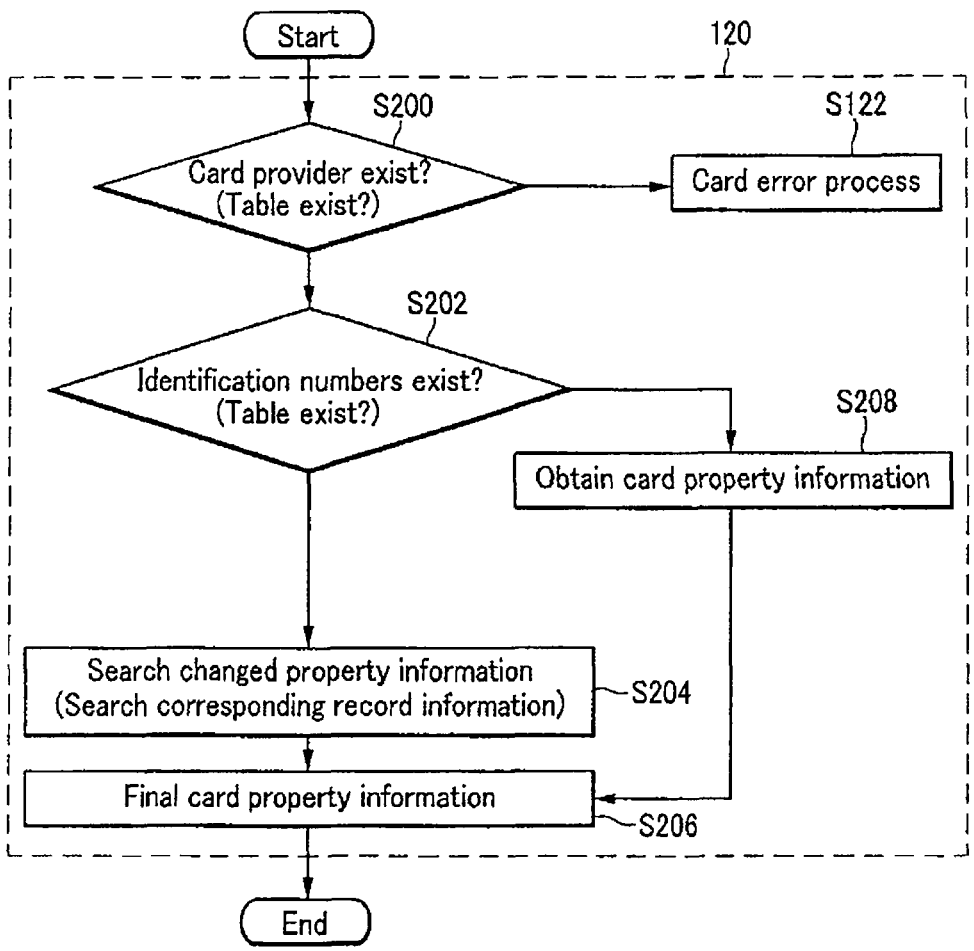
FIG. 6 is a flowchart representing a method for processing final card property information in the database management unit according to the exemplary embodiment of the present invention.

FIG. 6 is a flowchart representing a method for processing the final card property information in the database management unit 120 according to the exemplary embodiment of the present invention.

The database controlling unit 122 determines in step S200 whether there is a table corresponding to the provider identification numbers, based on the card numbers of the card property information deciphered by the card identifying unit 110. In further detail, when it is assumed that the card serial numbers are 4200 1243 5678 000, the database controlling unit 122 refers to the first six numbers (420012) that are the provider identification numbers to determine in step S200 whether there is a table having a table name that is the same as the provider identification numbers (or a table matched to the provider identification numbers).

When it is determined in step S200 that there are the provider identification numbers, the database controlling unit 122 determines in step S202 whether the table corresponding to the provider identification numbers includes the identification number group including the identification numbers corresponding to the card serial numbers. In further detail, the database controlling unit 122 detects minimum and maximum values of each identification number group, and determines based on the detected minimum and maximum values in step S202 whether there is an identification number group including the identification numbers corresponding to the card serial numbers.

When it is determined in step S202 that there is an identification number group corresponding to the card serial numbers, the database controlling unit 122 sequentially searches the identification number group from the minimum value to detect the identification numbers, and detects the property change information corresponding to the identification numbers to use it as the final card property information in steps S204 and S206. In this case, the database controlling unit 122 may inversely search the identification number group from the maximum value to detect the identification numbers.

In addition, when it is determined in step S202 that the table corresponding to the provider identification numbers does not include the update information, the database controlling unit 122 determines that the card property information was not changed after the card was issued, and uses the existing card property information (i.e., the card property information obtained from the card identifying unit 110) as the final card property information in steps S206 and S208.

Subsequently, the authorization processing unit 130 uses the obtained final card property information and performs the above authorization process.

Figure 7:
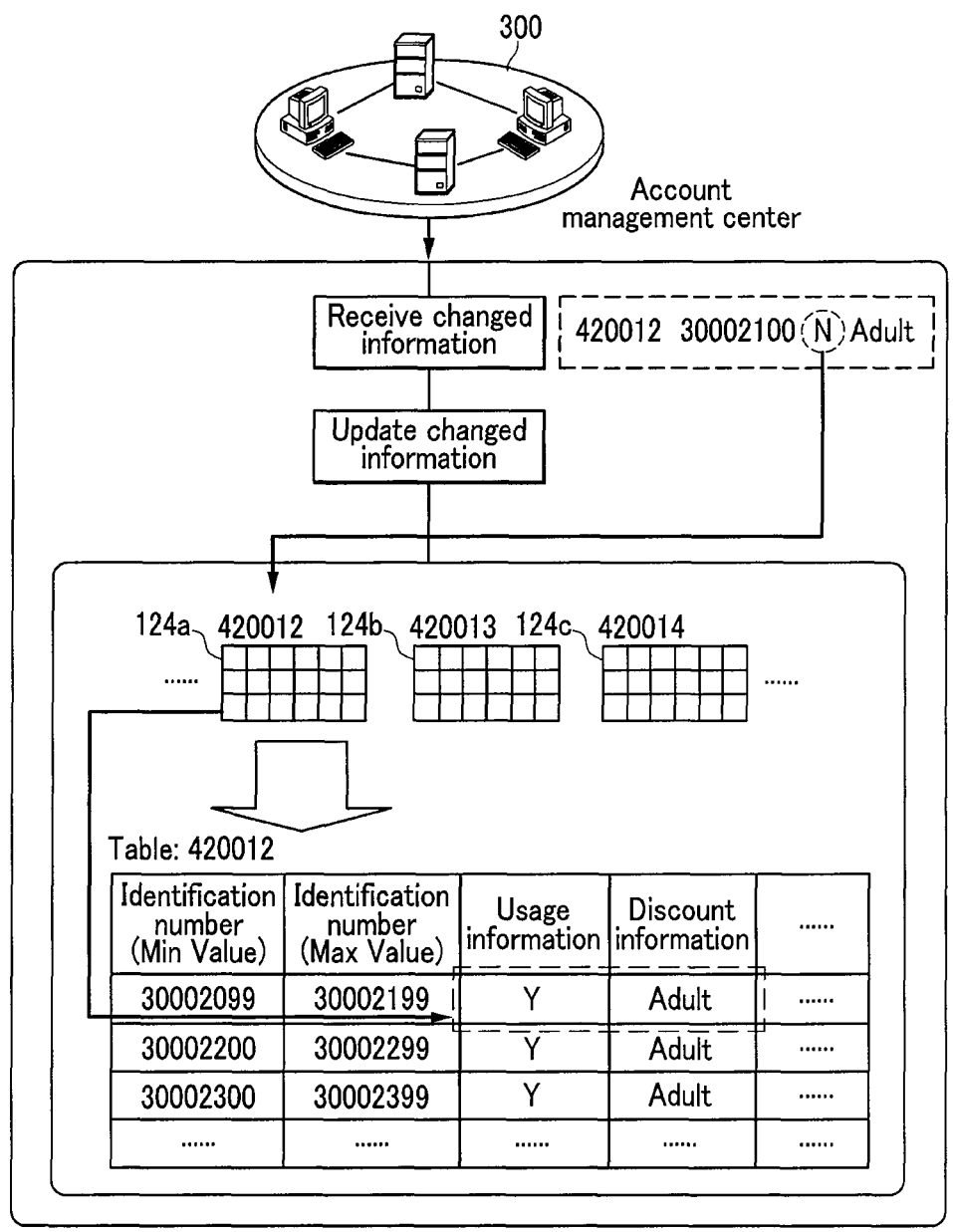
FIG. 7 is a diagram of a process for updating property information in the database management system according to the exemplary embodiment of the present invention.

FIG. 7 is a diagram of a process for updating the property information in the database management system according to the exemplary embodiment of the present invention.

As shown in FIG. 7, the account management center system 300 collects property information that is cyclically transmitted from the card provider system 200, and transmits the card property change information to the respective card authorization terminal systems 100.

Thereby, the change management unit 140 of the card authorization terminal system 100 receives the card property change information of "4200 1243 5678 000 N adult" from the account management center system 300, and transmits the received card property change information to the database management unit 120. In this case, the card property change information of "4200 1243 5678 000 N adult . . . O" includes provider identification numbers (420012), card serial numbers (435678000), and changed property information (N).

The database controlling unit 122 stores the card property change information (4200 1243 5678 000 N adult) received from the change management unit 140 in the temporary property change information database 126, searches a predetermined table from the provider identification numbers (420012) of the card property change information (4200 1243 5678 000 N adult) stored in the temporary property change information database 126 at a predetermined time, searches the identification number group including the identification numbers 3002100 corresponding to the card serial numbers, and updates the corresponding record based on the changed property information (N).

The plurality of tables 124a, 124b, and 124c included in the master property change information database 124 may be formed to be different from those shown in FIG. 5 and FIG. 7, which will be described with reference to FIG. 8.

Figure 8:
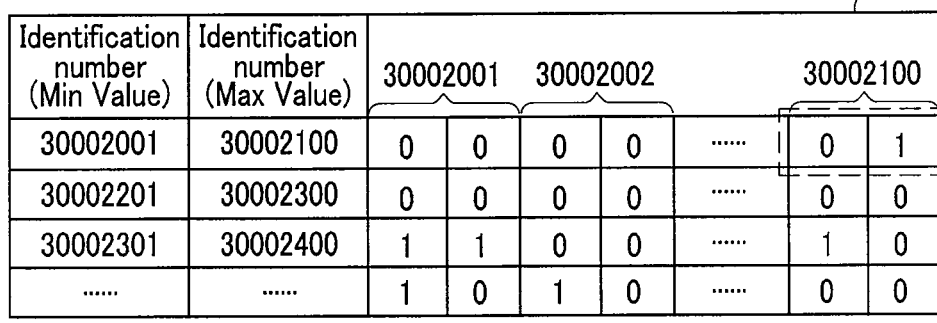
FIG. 8 is a diagram representing another table of the database according to the exemplary embodiment of the present invention.

FIG. 8 is a diagram representing a table 124a' of the database 124 according to the exemplary embodiment of the present invention.

As shown in FIG. 8, the table 124a' of the database 124 according to the exemplary embodiment of the present invention includes identification numbers for each row and usage information and discount information corresponding to the identification numbers. For example, as shown in FIG. 8, a first row of the table 124a' includes assignment bits corresponding to 100 identification numbers (30002001-30002100), and the property change information of the respective 100 identification numbers may be respectively stored in the assignment bit corresponding to the respective identification numbers. Here, the assignment bit is used to store the usage information and the discount information of each identification number by using "0" or "1" For example, as shown in FIG. 8, the 100 identification numbers may be arranged from a minimum identification number "30002001" to a maximum identification number "30002100", they may be inversely arranged from the maximum identification number to the minimum identification number, or a predetermined number may be firstly arranged according to a user's assignment. Further, as shown in FIG. 8, two bits may be assigned for one identification number, or more bits may be assigned for each identification number.

In addition, one of the two bits assigned to each identification number may be used to store the usage information and the other may be used to store the discount information. Here, it is assumed that an upper bit of the two bits is the usage information and a lower bit is the discount information. In addition, it is assumed that "0" of the usage information indicates a usable state and "1" indicates an unusable state. Further, it is assumed that "0" of the discount information indicates a youth discount state and "1" indicates an adult state (non-discount).

In this case, since the usage information and the discount information corresponding to the identification number "30002100" are respectively "0" and "1", the assignment bit corresponding to the identification number "30002100" includes the property information of a usable card of a youth discount fare.

As described above, the table 124a' includes the 100 identification numbers for each row and the usage information and the discount information corresponding to the identification numbers. However, when there is no changed property information for the 100 identification numbers, the table 124a' is established not to store the 100 identification numbers without the changed property information. That is, as shown in FIG. 8, the table 124a does not include 100 identification numbers of "30002101" to "30002200" because there is no changed property information for the 100 identification numbers (30002101-30002200).

Differing from the table 124a shown in FIG. 5 and FIG. 7, the table 124a' included in the database 124 shown in FIG. 8 may differently store changed property information for the respective identification numbers in a row. Therefore, it is beneficial to use the table 124a shown in FIG. 5 and FIG. 7 when neighboring identification numbers have similar changed property information, otherwise it is beneficial to use the table 124a' shown in FIG. 8.

In addition, when the table 124a' shown in FIG. 8 is stored in the database 124, the step S204 among the method for processing the final card property information shown in FIG. 6 is required to be changed. That is, it is determined is step S202 that there is an identification number group corresponding to the card serial numbers, and the database controlling unit 122 determines a bit value of an assignment bit corresponding to the identification number in the detected identification number group and searches property change information corresponding to the determined bit value in step S204'.

As described, according to the exemplary embodiment of the present invention, tables are generated in a database management system according to identification numbers for identifying the card provider, and serial numbers, identification numbers corresponding to the serial numbers, and property information are stored with respect to the card numbers including the changed properties. In addition, since it is simultaneously determined through one piece of card property change information whether it is a card provider card and property information is changed, and a searching time for stored property change information is reduced, a card authorization process may be quickly performed.

Further, according to the exemplary embodiment of the present invention, since new property information may be managed by adding one column to the table when the new property information is added to be managed, various pieces of property information may be added and managed in a relatively small memory space.

In addition, according to the exemplary embodiment of the present invention, since the database management unit 120 is realized as the DBMS, which is an exclusive process using a process that is different from the authorization process, malfunctions of some units may not affect other units, and therefore the card authorization terminal system may be stably managed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A card authorization terminal system comprising:
a card identifying unit to decipher card property information stored in a card and determining whether the card is valid;
a database management unit to determine final card property information based on the card property information deciphered by the card identifying unit and property change information stored in the database management unit; and
an authorization processing unit to calculate charges and processing card transactions based on the final card property information generated by the database management unit, wherein the database management unit is to generate identification numbers sequentially assigned from a predetermined number with respect to respective card numbers corresponding to the property change information, to store the identification number and the property change information corresponding to the identification numbers, and to determine the final card property information corresponding to the card property information based on the stored property change information.

2. The card authorization terminal system of claim 1, wherein the database management unit is realized as a database management system (DBMS) using an exclusive process that is different from those of the authorization processing unit and the card identifying unit.

3. The card authorization terminal system of claim 1, further comprising a change management unit to cyclically receive new property change information and providing the property change information to the database management unit.

4. The card authorization terminal system of claim 3, wherein the database management unit comprises:
   a master property change information database to store the identification numbers and changed card property information;
   a temporary property change information database to temporarily store the new property change information received from the change management unit; and
   a database controlling unit to update the master property change information database based on the new property change information stored in the temporary property change information database.

5. The card authorization terminal system of claim 4, wherein the master property change information database comprises a plurality of tables matched to card provider identification numbers, and each table comprises a plurality of groups having the sequential identification numbers and stores a minimum value and a maximum value of the identification numbers.

6. The card authorization terminal system of claim 5, wherein each group stores the identification numbers and the property change information corresponding to all the identification numbers in a range of the minimum value to the maximum value.

7. The card authorization terminal system of claim 5, wherein each group comprises a predetermined number of identification numbers, and stores the property change information corresponding to the respective identification numbers within a range of the minimum value to the maximum value.

8. The card authorization terminal system of claim 7, wherein each group comprises at least one bit respectively corresponding to the identification numbers, and each bit indicates the property change information respectively corresponding to the identification numbers.

9. The card authorization terminal system of claim 3, wherein the database management unit comprises a plurality of tables matched to card provider identification numbers, and each table comprises a plurality of groups having the sequential identification numbers and stores a minimum value and a maximum value of the identification numbers respectively corresponding to the plurality of groups.

10. The card authorization terminal system of claim 9, wherein a name of each table is the same as the card provider identification numbers.

11. The card authorization terminal system of claim 3, wherein the new property change information has provider identification numbers, card serial numbers, and changed property information.

12. A card management method of a card authorization terminal system comprising a database management unit storing property change information, the card management method comprising:
   deciphering card property information written in a card;
   determining whether there are identification numbers corresponding to card numbers, and determining property change information that corresponds to the identification numbers and is stored in the database management unit to be final card property information when there are the identification numbers; and
   calculating charges by using the final card property information, and processing a card transaction list,
   wherein the identification numbers are sequentially assigned from a predetermined number with respect to the card numbers corresponding to the property change information by the database management unit.

13. The card management method of claim 12, wherein the determining of the identification numbers further comprises determining the deciphered card property information to be the final card property information when there are no identification numbers.

14. The card management method of claim 12, wherein the database management unit is realized as a database management system using an exclusive process.

15. The card management method of claim 12, wherein the database management unit comprises a plurality of tables matched to card provider identification numbers, and each table comprises a plurality of groups having the sequential identification numbers, and stores a minimum value and a maximum value of the identification numbers.

16. The card management method of claim 15, wherein a name of each table is the same as the card provider identification numbers.

17. The card management method of claim 15, wherein the determining of the identification numbers further comprises:
   determining whether there is a table corresponding to the card provider identification numbers included in the deciphered card property information;
   determining whether the table corresponding to the card provider identification numbers includes the group including the identification numbers corresponding to card numbers when there are the card provider identification numbers;
   determining the property change information corresponding to the identification numbers corresponding to the card numbers to be the final card property information when there is the group; and
   determining the deciphered card property information to be the final card property information when the table does not include the group.

18. The card management method of claim 15, wherein each group stores the identification numbers and the property change information corresponding to all the identification numbers in a range of the minimum value to the maximum value.

19. The card management method of claim 15, further comprising:
   externally receiving new property change information; and
   updating the property change information corresponding to the identification numbers, the minimum value, and the maximum value based on the received new property change information.

20. The card management method of claim 17, wherein each group comprises a predetermined number of identification numbers, and stores the property change information corresponding to the respective identification numbers within a range of the minimum value to the maximum value.

21. The card management method of claim 20, wherein each group comprises at least one bit respectively corresponding to the identification numbers, and each bit indicates the property change information respectively corresponding to the identification numbers.

22. The card management method of claim 21, wherein the determining of the property change information further comprises:
   determining a bit value of a bit corresponding to the identification numbers; and
   determining the property change information corresponding to the bit value to be the final card property information.

23. The card authorization terminal system of claim 1, wherein the database management unit comprises:
- a master property change information database to store the identification numbers and changed card property information;
- a temporary property change information database to temporarily store the new property change information received from the change management unit; and
- a database controlling unit to update the master property change information database based on the new property change information stored in the temporary property change information database.

24. The card authorization terminal system of claim 1, wherein the database management unit comprises a plurality of tables matched to card provider identification numbers, and each table comprises a plurality of groups having the sequential identification numbers and stores a minimum value and a maximum value of the identification numbers respectively corresponding to the plurality of groups.

\* \* \* \* \*